Jan. 18, 1966   R. F. STALLMAN   3,230,018
ROLLER BEARING WITH COMBINED GUIDING AND RETENTION MEANS
Filed July 20, 1962   2 Sheets-Sheet 1
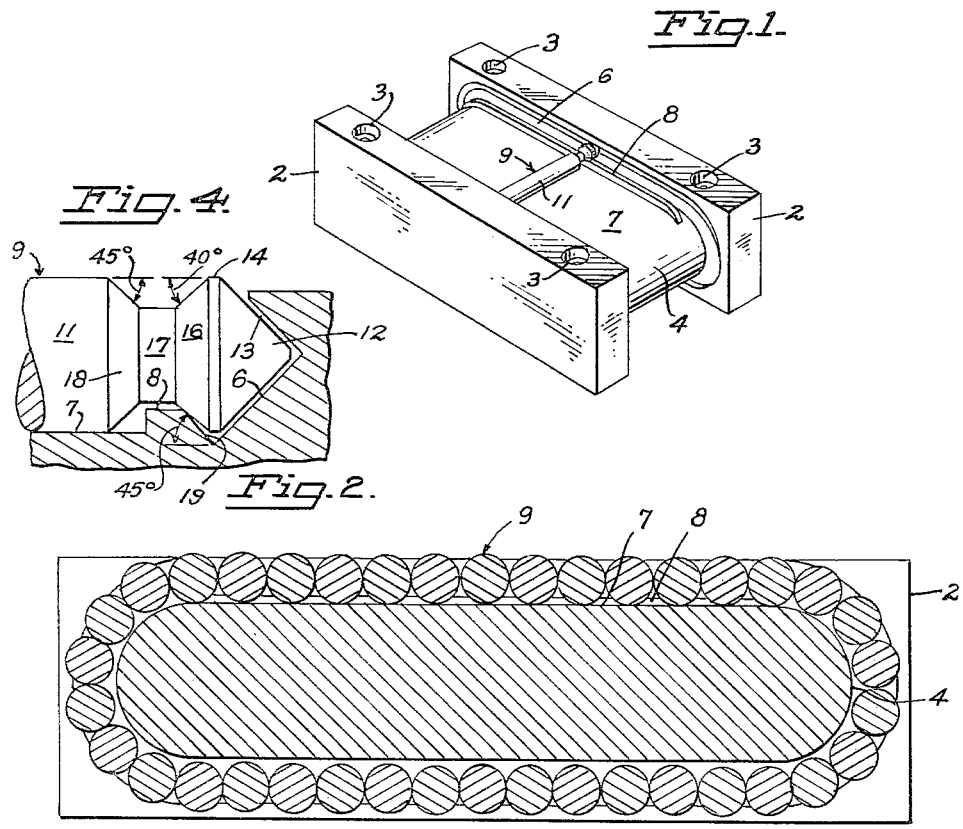
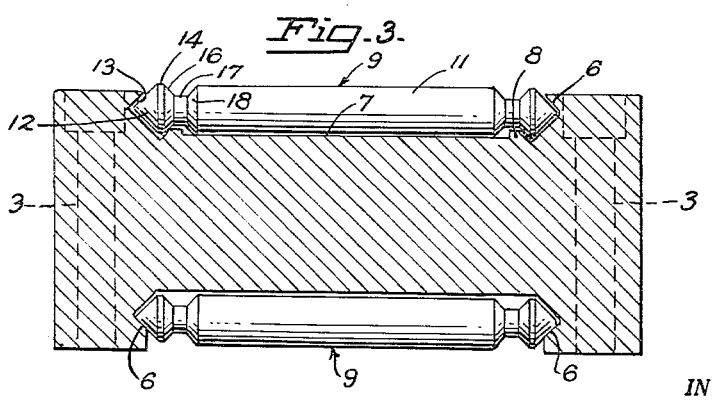
INVENTOR.
RALPH F. STALLMAN
BY
George B. White
ATTORNEY

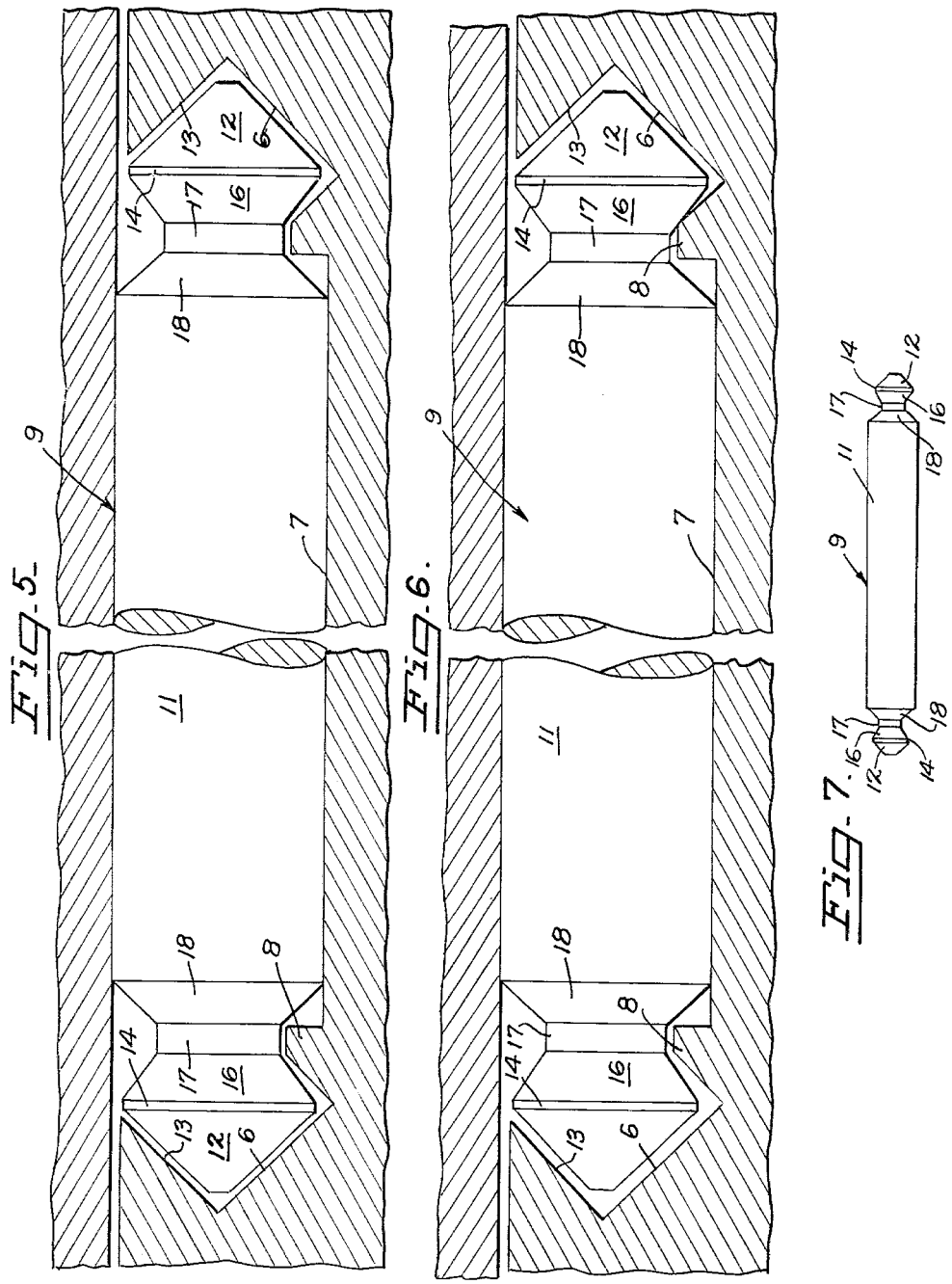

United States Patent Office 3,230,018
Patented Jan. 18, 1966

3,230,018
ROLLER BEARING WITH COMBINED GUIDING
AND RETENTION MEANS
Ralph F. Stallman, 4860 Reinhardt Drive, Oakland, Calif.
Filed July 20, 1962, Ser. No. 211,240
3 Claims. (Cl. 308—6)

This invention relates to a roller bearing with combined guiding and retention means.

In my Patent No. 2,334,227, granted on November 16, 1943, means were provided to correct skewing in roller bearings through the provision of center guiding means. Such arrangeemnt worked very well in a so-called fast bearing. In a slow or platen bearing the stroke of movement is too short, too slow or infrequent and with too few turns of the roller to bring about correction of the skewing in the load zone.

In the center guided rollers the leverage between the center reduced position of the roller where it contacts the center guide rail and the end of the roller is not sufficient to straighten the roller. In the center guided bearing of my said patent the leverage for correction is exerted over the distance between the shoulders of the reduced portion which is approximately 20% of the roller length. The roller bearing herein shown accomplishes a leverage over 90% of the roller length as the roller contacts the guide rail very near its leading end and the leverage on the trailing end of the roller is approximately 90% of roller length. Such proportions may be varied somewhat in various designs depending on the proportions of the roller. Experience shows that the advantages gained by substituting end guiding for the previous center guiding are very material and of importance.

A primary object of the invention is to provide rollers with guide means at the opposite ends in such relation as to combine the guiding function with the function of retaining the rollers in the bearing body.

Another object of the invention is to provide rollers with such combination guiding and retention means as to increase the leverage that may be exerted from the guided end for the straightening of the roller or in other words for correcting the skewing of the roller especially in the load zone.

Another object of the invention is to provide a bearing of a single body with specially formed guide grooves along the load zone as well as along the recirculating zone and at the ends between the zones to coact with the specially formed ends of the rollers in such a manner as to exert substantial leverage for correcting the skewing of the rollers.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings. With the foregoing and other objects in view, which will be made manifest in the following detailed description, reference is had to the accompanying drawings for the illustrative embodiment of the invention, wherein:

FIG. 1 is a perspective view of the body of a recirculating bearing showing one of the rollers in position.

FIG. 2 is a longitudinal sectional view of a recirculating bearing showing series of rollers all around the bearing body.

FIG. 3 is a cross-sectional view of the roller bearing.

FIG. 4 is a fragmental sectional view showing the advanced end of a skewed roller, and indicating the angles at the end of the roller, on the guide rail and in the guide groove on an enlarged scale.

FIG. 5 is a sectional view of the loadside of the bearing on an enlarged scale, showing the roller and the relative clearances on an enlarged scale.

FIG. 6 is a sectional view of the loadside of the bearing on an enlarged scale, showing the roller in skewed attitude.

FIG. 7 is a detail view of a roller with shortened conical ends.

In carrying out my invention I use a single piece body with parallel longitudinal and generally rectangular flanges 2. Bolt holes 3 extend transversely of the respective flanges 2 for securing the bearing body in position.

The central portion between the flanges 2 is built or otherwise formed into a track 4, the longitudinal outer circumference of which is of generally oval or elongated cross-section. Along the base of each flange 2 where it joins the oval track 4 there is provided a guide groove 6. Each guide groove 6 is parallel with the oval track 4.

Along the flat load zone 7 of the oval track 4 adjacent each guide groove 6 there is provided a guide rail 8.

Each roller 9 has a generally cylindrical middle portion 11. Each end 12 of the roller 9 is formed into a shape corresponding to and loosely fitting into the adjacent guide groove 6. For instance in the herein illustration each end 12 of the roller is conical and each guide groove 6 is of generally V-shaped cross-section with sufficient clearance, as indicated at 13, to allow the rotation and necessary play for the respective ends 12 of the roller 9.

From the largest diameter 14 or the base of the cone of each roller end 12 the end is tapered inwardly to form a frusto conical portion 16, merging into a cylindrical reduced neck 17. A mitered or tapered portion 18 merges the reduced portion 17 into the cylindrical middle portion 11 of the roller. The tapered groove so defined by the frusto conical portion 16, the reduced neck 17 and the tapered portion 18 loosely fits over the adjacent respective guide rail 8, so that the tapered groove normally does not contact the rail 8.

Each guide rail 8 extends along the entire length of the flat surface of the load zone 7. This load zone 7 is ground finished between the two guide rails 8 to reduce friction. It is significant that the frusto-conical portion 16 inclines at a lesser angle than the angles of the side of the rail 8 nearer to the guide groove 6, so that the rail 8 contacts with the frusto-conical portion 16 of the advanced end of a skewed roller in the intermediate area of the adjacent frusto-conical surface, as shown in FIG. 4.

The semi-cylindrical ends of the track 4 are tangents to the opposite flat portions of the track. The rails 8 are also terminating or tapering tangentially into the curved ends of the oval track, so that the tracks 4 are limited to the load zone 7.

In operation the single piece body lends itself to simplicity, good heat treatment, low manufacturing cost and many other advantages. Among them is the advantage that it can be milled on conventional tools in the desired shape and form. The rollers 9 are set in place by holding them in the skewed attitude sufficiently to insert the opposite ends partly into the respective guide grooves 6 and then the rollers 9 are straightened so that their axis is at right angles transversely of the oval track 4. The last roller 9 to be inserted is the key roller to hold the other rollers in place but usually there is not sufficient space left for the insertion of the last roller in a skewed position. The last roller is, therefore, shortened by grinding the respective conical ends 12 sufficiently to permit the snapping of it in place past the retaining lips of the respective guide groove 6. It was found that after assembly it is difficult to distinguish the shortened roller from the other rollers.

The rollers 9 on the recirculating path, namely at both ends and on the lower portion of the track 4 in the illustration, free on all sides and are pushed along and around for recirculation to the load zone as they are guided and the rollers do not necessarily turn during this recirculating part of their path. The rollers in the load zone 7, which in the present illustration is at the top of the body, are also free except for contact with the working surfaces on the load. Whenever any of the rollers in the load zone skews the frusto-conical portion 16 at the advanced end of the roller 9 contacts the outside of the respective adjacent guide rail as the skewing takes place. The clearances at the ends of the rollers and in the guide grooves and over the rails, particularly in the reduced portions of the rollers, are such that when, in a complete side-by-side complement of rollers, at one end of a skewed roller contact is made with one guide rail no contact can be made by the same roller at its other end with the other guide rail. The forces causing the skewing or the advancing of one end of the roller exert a component force axial to the roller and tend to push the advanced end of the skewed roller against the adjacent rail and push the trailing end away from the other rail, thus the spacing between the frusto-conical portion of the roller and the rail at the trailing end of the skewed roller obviates contact with the rail at said trailing end. The angle of cone of the conical ends 12 and the angle of the tapered portions 18 nearest the respective middle portion 11 of roller 9, and the angle of the inclined side 19 of the guide rail 8 are 45°. The angle of the frusto-conical portion 16 extending toward the reduced neck 17 from the base of each conical end 12 is less than 45° to the horizontal center line so that when a roller is skewed the frusto-conical portion 16 of the advanced end of the skewed roller contacts the adjacent inclined side 19 of the guiderail 8 on a peripheral line on the frusto-conical portion 16 spaced from said reduced neck 17 and from the base of said conical end 12. It is significant that all clearances are so made that all other contours are normally free except the rolling surfaces on the load.

As one of the rollers skews in one direction the leading end of the roller engages the outer inclined wall of the adjacent guide rail and increased friction will slow down the movement or relative rotation of that leading end, so as to permit the trailing end to catch up with the leading end and thereby correct the skewing. In each instance only the inclined frusto-conical portion 16 at the leading edge engages the adjacent outer inclined side 19 of the rail 8 on a peripheral line between the largest diameter or base 14 and cylindrical neck 17 for positive leverage for the correction of the attitude of the roller.

I claim:
1. In a recirculating roller bearing
   (a) a roller track,
   (b) a plurality of rollers of the same diameter arranged transversely in parallel side by side control covering the entire track,
   (c) a reduced neck near each end of each roller,
   (d) a head formed at the outer end of each reduced neck,
   (e) a frusto-conical side of said head tapering from the outer periphery of said head to said reduced neck,
   (f) a substantially conical tip tapering axially outwardly from the outer periphery of said head,
   (g) a pair of spaced guide rails on the load side only of the track in registry with the respective reduced necks and in normal operative attitude spaced from said reduced neck and from said frusto-conical side of said head, the side of each rail facing the adjacent frusto-conical side of the adjacent head being inclined outwardly of the track,
   (h) a retaining member along each edge of the track,
   (i) each retaining member having guide groove therein all around and parallel with the track loosely surrounding and being spaced from the adjacent conical tips of said rollers,
   (j) the relative angle of said frusto-conical side of said head and said inclined facing side of the rail being such that in the skewed position of a roller only a peripheral line of the frusto-conical side between the reduced neck and the outer periphery of said head of the advanced end of the roller contacts the facing inclined side of the rail to create a force for straightening the skewed roller.

2. The recirculating roller bearing defined in claim 1, wherein
   (k) the angle of said frusto-conical side being less than 45°, and the angle of said facing inclined side of the rail being at least 45°.

3. The recirculating roller defined in claim 1, wherein
   (l) the roller track includes a load zone and a spaced return zone with curved connecting portions between the ends of said zones,
   (m) the said parallel rails extending only along the said load zone and tapering into the curved connecting portion at each end of said load zone,
   (n) and the guide grooves extending all around the track adjacent of all zones and said connecting portions.

References Cited by the Examiner
UNITED STATES PATENTS

| | | | |
|---|---|---|---|
| 915,529 | 3/1909 | Zahn | 308—215 X |
| 1,986,274 | 1/1935 | Linn | 308—206 |
| 2,033,074 | 3/1936 | Herrmann | 308—217 X |
| 2,197,351 | 4/1940 | Smith | 308—213 |
| 3,003,828 | 10/1961 | Stark | 308—6 |

FOREIGN PATENTS

| | | |
|---|---|---|
| 1,116,656 | 2/1956 | France. |
| 1,193,830 | 5/1959 | France. |
| 867,481 | 2/1953 | Germany. |
| 17,841 | 8/1906 | Great Britain. |
| 704,218 | 2/1954 | Great Britain. |

DON A. WAITE, *Primary Examiner.*

FRANK SUSKO, ROBERT C. RIORDON, *Examiners.*